United States Patent [19]

Friggstad

[11] 4,249,615
[45] Feb. 10, 1981

[54] TWO-STAGE TRIP RELEASE SHANK ASSEMBLY

[75] Inventor: Terrance Friggstad, Frontier, Canada

[73] Assignee: Friggstad Manufacturing Ltd., Frontier, Canada

[21] Appl. No.: 34,335

[22] Filed: Apr. 30, 1979

[51] Int. Cl.$^2$ ............................................. A01B 61/04
[52] U.S. Cl. ..................................... 172/266; 172/711
[58] Field of Search ............... 172/264, 265, 266, 267, 172/268, 705, 710, 711

[56] References Cited

U.S. PATENT DOCUMENTS

| | | | |
|---|---|---|---|
| 2,406,353 | 9/1959 | Rogers | 172/265 |
| 3,098,529 | 7/1963 | Wade et al. | 172/265 |

FOREIGN PATENT DOCUMENTS

| | | | |
|---|---|---|---|
| 2728431 | 1/1979 | Fed. Rep. of Germany | 172/266 |
| 460590 | 5/1928 | Fed. Rep. of Germany | 172/705 |

*Primary Examiner*—Richard T. Stouffer
*Attorney, Agent, or Firm*—Stanley G. Ade

[57] ABSTRACT

An implement shank is pivotally attached to the frame of the implement and normally is maintained in the soil by a heavy duty coil spring reacting between the shank and a support extending from the frame. The spring mount and shank holder are connected together so that if the shank trips due to striking an obstruction, the connection moves towards an over center line and if the obstruction is maintained, the connection moves over the over center line. When it passes over center, it engages a leaf spring extending from the frame which returns the connection back over center when the obstruction is passed whereupon the coil spring returns the implement into the ground. The coil spring is attached to a resilient member extending from the frame so that the shock load is absorbed as the implement returns to the ground engaging position, particularly when this return is somewhat rapid due to the heavy duty nature of the coil spring.

6 Claims, 3 Drawing Figures

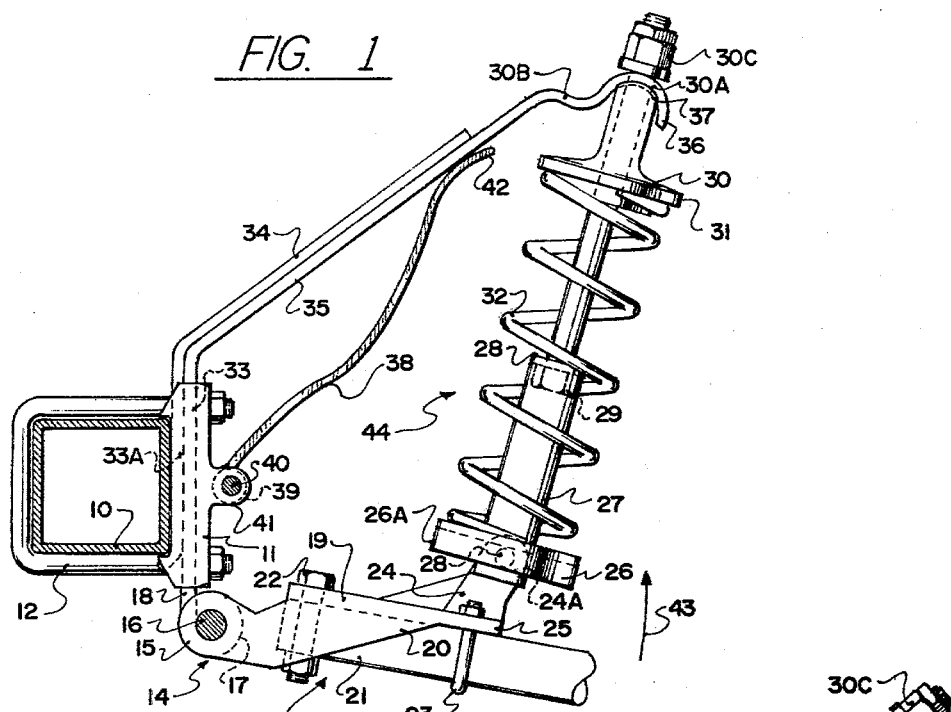
FIG. 1
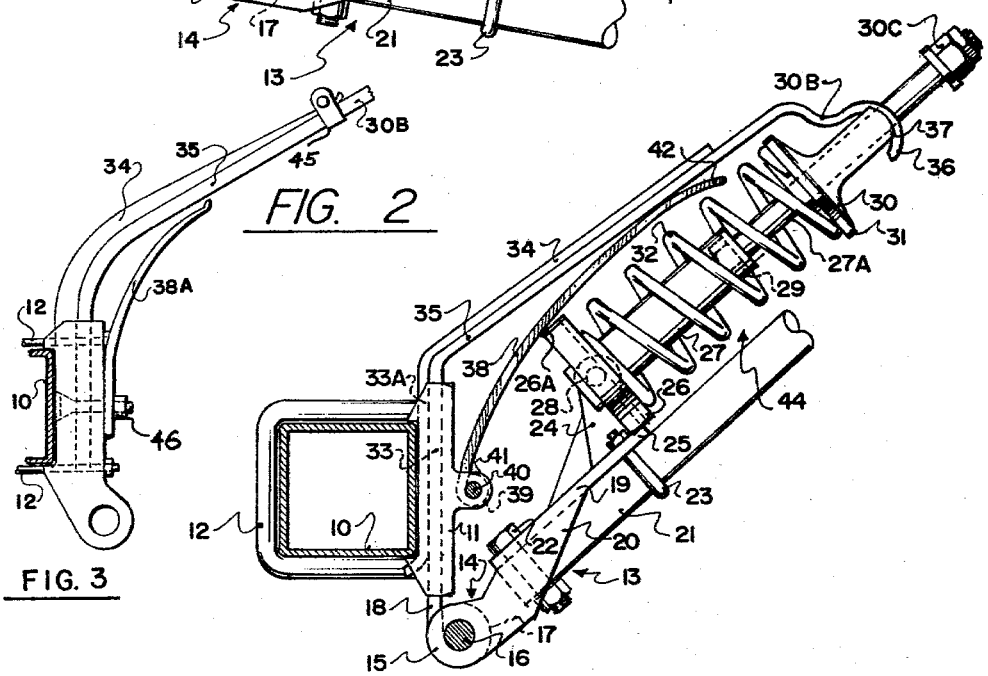
FIG. 2
FIG. 3

TWO-STAGE TRIP RELEASE SHANK ASSEMBLY

BACKGROUND OF THE INVENTION

This invention relates to new and useful improvements in trip mechanisms for ground engaging implements mounted upon a shank or the like and which are adapted to trip and return if the implement on the end of the shank, strikes an obstruction such as a rock, root or the like.

The majority of implement trip release mechanisms include a coil spring which compresses as the obstruction is engaged. However, as the degree of tripping increases, the coil spring pressure increases but the leverage of the assembly usually decreases. The movement of the trip mechanism and hence the pressure generated thereby, is restricted inasmuch as the pivotal connection between the spring and the shank assembly cannot pass through an over center position otherwise the shank would lock in an "up" position.

Because it cannot be over centered, the trip height of the shank assembly is limited so that damage can occur particularly when a relatively immovable obstruction is reached such as a rock which may be close to or even extend slightly above the surface of the ground.

Furthermore, another problem experienced by conventional shank tripping assemblies is the shock of the returning mechanism bottoming out on a solid mounting bracket thus causing stress and fatigue. This occurs when the obstruction is finally passed and the heavy duty coil spring, which is usually fully compressed at this point, snaps the ground engaging implement back into position with considerable force.

Applicant is aware of the following patents in this general field: namely U.S. Pat. Nos. 3,662,839, 3,527,307, 2,395,342, 3,981,367, 3,098,529, 2,850,956 and 3,108,643. However, none of these overcome disadvantages inherent with such tripping devices.

SUMMARY OF THE INVENTION

The present invention overcomes these disadvantages and one aspect of the invention consists of a trip release shank assembly for implements which include a frame, said trip release shank assembly comprising in combination a shank assembly pivotally secured by one end thereof to said frame, spring means secured by one end thereof to said shank assembly, means extending from said frame supporting the other end of said spring means, said spring means normally urging said shank assembly downwardly, the connection of said spring means to said shank assembly passing over center when said shank assembly fully trips and means to return said connection back over center when the obstruction causing said shank assembly to trip, has been passed, said means to return said connection between said spring means and said shank assembly back over center including a leaf spring secured by one end thereof to said frame and operatively engaging, by the other end thereof, said extending means adjacent said connection between said spring means and said shank assembly, when said shank assembly trips.

Another aspect of the invention comprises a two-stage trip assembly for ground engaging implements comprising in combination an implement frame, a shank assembly pivoted by one end thereof to said frame, said shank assembly including a shank holder, a shank mounted in said holder and extending therefrom, spring means pivotally secured by one end thereof to said shank holder, means extending from said frame, said spring means being pivotally supported by the other end thereof to said last mentioned means, the pivotal connection between said shank assembly and said spring means being normally urged downwardly to lie on one side of an imaginary line extending between said pivotal connection of said shank holder to said frame and said pivotal connection of the other end of said spring means, to said means extending from said frame, said point of pivotal connection passing over center to the other side of said imaginary line when said shank assembly fully trips and not passing over center when said shank assembly partially trips, and means co-operating between said shank assembly and said implement to return said point of pivotal connection from said other side of said imaginary line to said one side thereof when the obstruction causing said ground engaging implement to trip, has been passed.

A further advantage is the fact that the mounting for the spring assembly may consist of a leaf spring assembly which reduces the shock load encountered when the trip assembly is returned to the ground engaging position after an obstruction has been passed.

Yet another advantage of the present invention is to provide a device of the character herewithin described which is simple in construction, economical in manufacture and otherwise well suited to the purpose for which it is designed.

With the foregoing in view, and other advantages as will become apparent to those skilled in the art to which this invention relates as this specification proceeds, the invention is herein described by reference to the accompanying drawings forming a part hereof, which includes a description of the preferred typical embodiment of the principles of the present invention, in which:

DESCRIPTION OF THE DRAWINGS

FIG. 1 is a side elevation of part of an implement frame showing the invention incorporated in a trip assembly in the normal ground working position.

FIG. 2 is a view similar to FIG. 1, but showing the trip assembly in the fully tripped position.

FIG. 3 is a fragmentary view showing an alternate construction.

In the drawings like characters of reference indicate corresponding parts in the different figures.

DETAILED DESCRIPTION

Although the device may be utilized with practically any form of ground engaging farm implement which utilizes a trip mechanism, nevertheless it is particularly suitable for use with cultivators and the like. The implement concerned normally includes a transverse frame member 10 around which the entire shank assembly may be secured. In this particular embodiment, a substantially vertical mounting plate 11 is clamped in position upon the tubular frame 10 by means of U-bolt assemblies 12.

A shank assembly is provided collectively designated 13 and in this particular embodiment, the shank assembly includes a shank holder collectively designated 14 including a hinge sleeve 15 at the inner end thereof engaging around a hinge pin or bolt 16 which in turn engages a further hinge sleeve 17 formed on the lower end of a support member 18.

The shank holder 14 includes the shank socket 19 together with side support plates 20 into which the upper or inner end 21 of a shank is secured by means of a nut and bolt assembly 22 at the inner end thereof and a U-bolt assembly 23 spaced therefrom. The shank may be resilient or non-resilient depending upon design parameters and usually carries a ground engaging tool (not illustrated) on the lower end thereof.

Spring support lug 24 extends upwardly from the plate 25 forming the socket 19 of the shank holder and a spring cup 26 secured to the lower end of a spring support member 27, is pivotally secured to the upper end 24A of the lug, by means of pivot pin or shaft 28 as shown.

An elongated bolt 27A extends through the closed upper end 28 of the tubular member 27 with the bolt head 29 being secured internally and this bolt passes through an upper spring anchor component 30 which is slidable on bolt 27A, and also passes through an aperture 30A in the upper end of a support member 30B, to be secured by locking nut 30C on the screw threaded end of the bolt.

An annular shoulder 31, of portion 30, is engaged by the upper end of a heavy duty coil spring 32. The lower end of this coil spring engages the spring cup or shoulder 26.

The support 30B preferably takes the form of an elongated spring steel member, the vertical leg 33 of which is clamped to the frame by means of the U-bolts 12 and the lower end of the vertical portion 33 constitutes the support 18 in this embodiment, to which the shank holder is pivotally secured. A reinforcing resilient steel spring member 34 overlies the diagonally extending portion 35 of this member 30B and also includes a vertical portion 33A clamped by U bolts 12, to the frame member 10.

The distal end 36 of the member 30B is arcuately curved and engages between a pair of spaced vertical flanges 37 formed on the upper end of the member 30 thus mounting the member 30 for pivotal movement within the arcuately curved end 36.

A leaf spring member 38 is formed with an eye 39 on one end thereof engaging around a pivot pin 40 held within lugs 41 extending from the member 11 between the legs of the U bolts 12. This arcuately curved leaf spring terminates in the reverse curved end portion 42 and normally bears against the underside of the diagonally extending portion 35 of the resilient member 30B. This leaf spring is preferably curved downwardly towards the shank when in the ground engaging position shown in FIG. 1.

In operation, if an obstruction is engaged by the ground engaging tool on the end of the shank, the shank pivots upwardly in the direction of arrow 43 around pivot 16 thus compressing spring 32 with the bolt sliding through member 30 and the end 36 of the member 30B. Under normal tripping conditions, the pivotal connection 28 between the shank holder 14 and the spring assembly collectively designated 44, does not pass beyond an imaginary line extending between pivot point 16 and the pivotal connection formed by the curved end 36 of member 30B engaging over the saddle on the upper end of member 30. This means that when the obstruction is passed, the spring expans thus returning the shank to the original position. Any shock load is taken up by the resiliency of the support members 30B and 34.

If, however, the obstruction is relatively large, then the pivotal connection 28 between the shank holder 14 and the spring assembly 44 passes beyond this imaginary line so that the side 26A of the spring cup or member 26 engages the curved surface of the leaf spring 38 and compresses same in the reverse curved position as clearly shown in FIG. 2 thus giving a greater degree of lift to the ground engaging implement in order to enable it to clear the obstruction.

Once the obstruction has been passed, the leaf spring 38 which is under tension, bears against the portion 26A and moves the pivot 28 diagonally downwardly across the imaginary line so that the heavy duty coil spring can once again the ground implement to the normal working position. It is under these circumstances that the resilient mounting 30B and 34 are of particular value in order to reduce the shock load which may occur to the structure under normal circumstances with the subsequent damage occurring thereto.

FIG. 2 shows the preferred embodiment in which the leaf springs 30B and 34 are clamped together adjacent the extremity of the spring 34 as indicated by encircling clamp 45. Furthermore, the leaf spring 38A is arcuately curved but is still engaged by member 26A when the mechanism trips.

This leaf spring 38A is clamped adjacent the lower end thereof to the mounting plate 11 by means of nut and bolt assembly 46. The clamping of the members 34 and 30B enables utilization of the upper member 34 to act in a shock absorbing fashion in the return action of the trip mechanism.

Summarizing, the invention consists firstly of a two-stage trip mechanism with over center spring for enhancing the trip height and secondly, the mounting of the assembly on the leaf springs 30B and 34 acting as the main construction members to support the assembly, give shock absorbing qualities to the trip mechanism and reduce damage thereto.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A trip release shank assembly for implements, said trip release shank assembly comprising in combination a frame, a shank assembly pivotally secured by one end thereof to said frame, spring means connected by one end thereof to said shank assembly, means extending from said frame supporting the other end of said spring means, said spring means normally urging said shank assembly downwardly, the connection of said spring means to said shank assembly passing over center when said shank assembly fully trips and means to return said connection between said spring means and said shank assembly back over center when the obstruction causing said shank assembly to trip has been passed, said means to return said connection between said spring means and said shank assembly back over center including a leaf spring secured by one end thereof to said frame and operatively engaging, by the other end thereof, said extending means adjacent said connection between said spring means and said shank assembly when said shank assembly trips.

2. The invention according to claim 1 in which said shank assembly includes a shank holder pivoted by one end thereof to said frame, a shank detachably secured to said holder, said spring means being pivotally secured by one end thereof to the other end of said shank holder, said spring means including spring guide means and a coil spring extending around said spring guide means.

3. The invention according to claims 1 or 2 in which said means supporting said spring assembly is resilient to reduce the shock load on said assembly when same is returned to the working position when said obstruction has been passed.

4. A two-stage trip assembly for ground engaging implements comprising in combination an implement frame, a shank assembly pivotally connected by one end thereof to said frame, said shank assembly including a shank holder, a shank mounted in said holder and extending therefrom, spring means connected by one end thereof to said shank assembly, means extending from said frame, said spring means being connected by the other end thereof to said extending means, the connection between said shank assembly and said spring means being normally urged downwardly by said spring means to lie on one side of an imaginary line extending between said pivotal connection of said shank assembly to said frame and said connection of the other end of said spring means to said means extending from said frame, said connection between said shank assembly and said spring means passing over center to the other side of said imaginary line when said shank assembly fully trips and not passing over center when said shank assembly partially trips, and means co-operating between said shank assembly and said implement frame to return said connection between said shank assembly and said spring means from said other side of said imaginary line to said one side thereof when the obstruction causing said ground engaging implement to trip has been passed, said means to return said connection between said shank assembly and said spring means back over center including a leaf spring secured by one end thereof to said frame and operatively engaging, by the other end thereof, said extending means adjacent said connection between said shank assembly and said spring means, when said shank assembly trips.

5. The invention according to claim 4 in which said means supporting said spring assembly is resilient to reduce the shock load on said assembly when same is returned to the working position when said obstruction has been passed.

6. The invention according to claims 4 or 5 in which the connection between said spring means and said shank assembly is pivotal.

* * * * *